July 16, 1929.  F. O. SNOW, JR  1,721,262

SNOWPLOW

Filed March 11, 1926   3 Sheets-Sheet 1

Inventor:
Frederick Orren Snow Jr.

July 16, 1929.  F. O. SNOW, JR  1,721,262
SNOWPLOW
Filed March 11, 1926   3 Sheets-Sheet 2
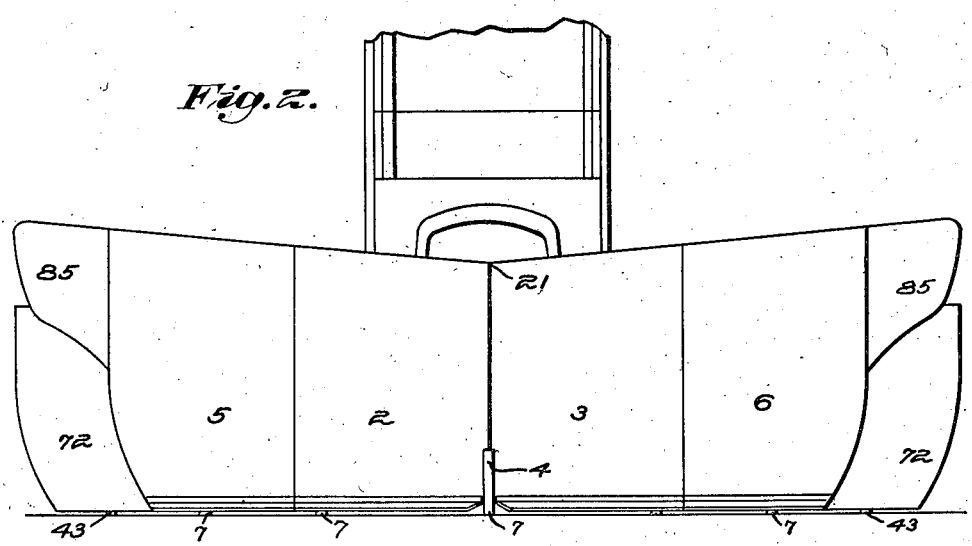
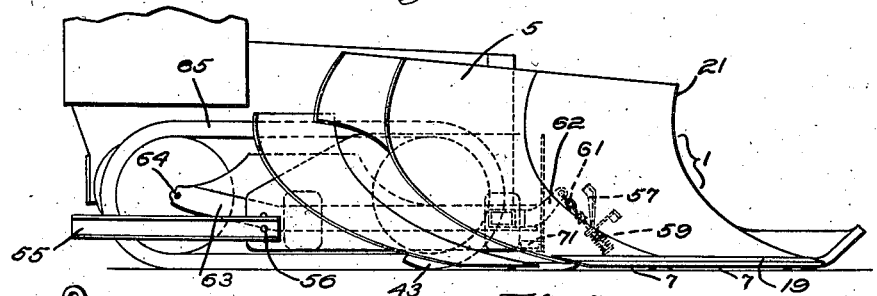
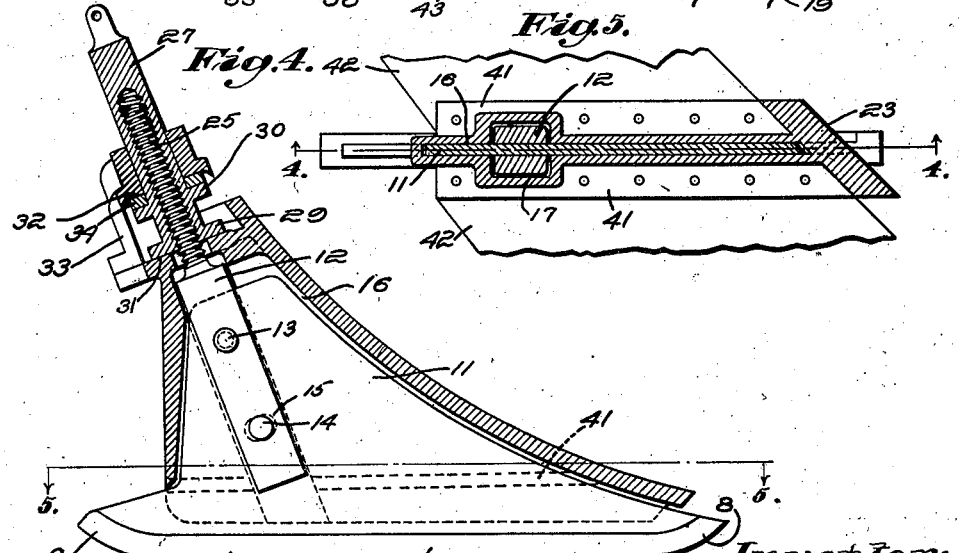
Inventor:
Frederick Orren Snow Jr.

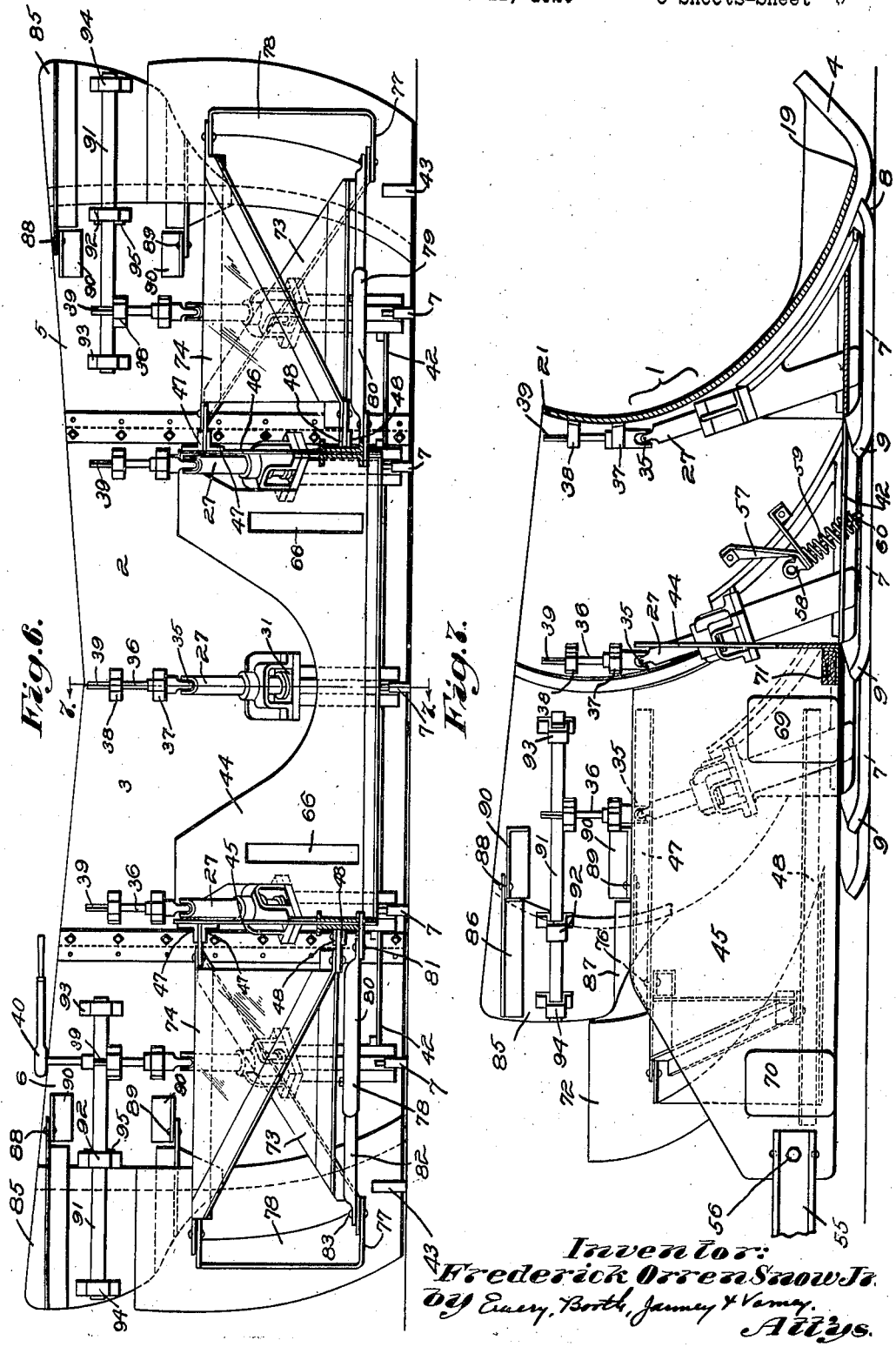

Patented July 16, 1929.

1,721,262

UNITED STATES PATENT OFFICE.

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE.

SNOWPLOW.

Application filed March 11, 1926. Serial No. 93,869.

This invention relates to snow plows and its aim is to provide a plow that is particularly adapted for use with tractors, the accompanying drawings showing merely for illustrative purposes one embodiment of the invention, wherein:

Fig. 2 is a front elevation of the same;

Fig. 3 is a side elevation thereof;

Fig. 4 is a detail vertical section taken on the line 4—4 of Fig. 5;

Fig. 5 is a detail plan section on the line 5—5 of Fig. 4;

Fig. 6 is a view looking from the rear into the plow, the tractor being removed and parts of the frame which surrounds the tractor being broken away with other parts in section; and Fig. 7 is a vertical section partly in elevation taken substantially on the line 7—7 of Fig. 6.

Figure 1:
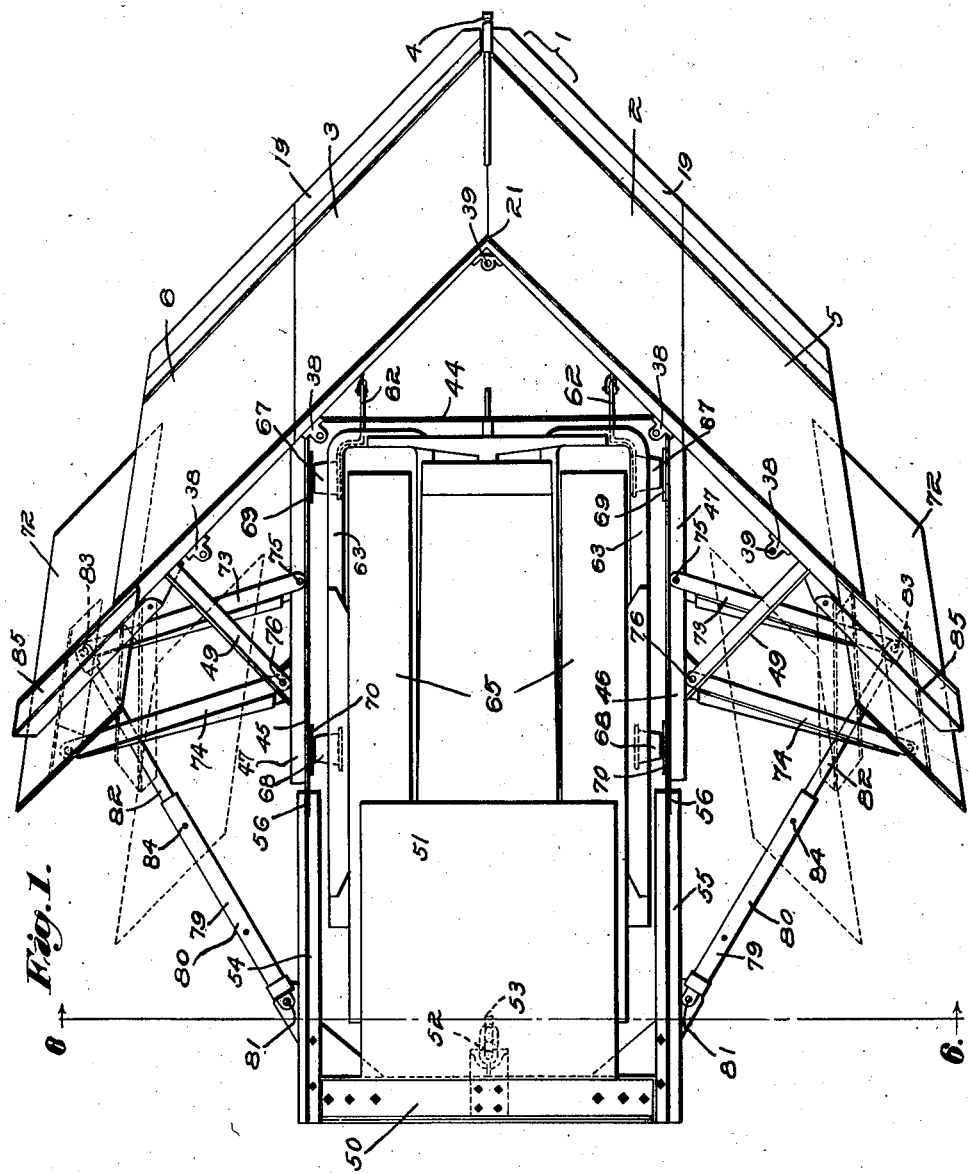
Fig. 1 is a plan view of a plow and tractor shown in operative relation.

Referring to the drawings, 1 is a snow plow, herein comprising V-shaped rearwardly diverging side or snow removing members 2 and 3 which are united in a forwardly projecting runner-like prow 4 arranged normally to rest upon the snow. The diverging members 2 and 3 are extended rearwardly in wings 5 and 6 joined respectively to the outer ends of the members 2 and 3 in any appropriate manner so that they may when occasion requires be removed at said joints to make a narrower plow for use in more restricted places, though for general purposes said wings will be utilized.

Desirably the plow is supported upon runners 7 appropriately positioned to support the nose and wings of the plow at relatively short distances apart. For example one of these runners is shown arranged directly beneath the nose of the plow and at the rear of the prow 4. Also one of said runners 7 is positioned adjacent to the rear edge of each of the side members 2 and 3 of the plow and still other runners are arranged near the outer ends of the wings 5 and 6, thus evenly distributing the weight over substantially the entire breadth of the plow structure.

It is often desirable to raise or lower the snow removing elements of the plow so as to leave a greater or less depth of snow upon the roadway or to clear obstructions such as curb stones or the like lying in the path of the plow.

To this end the runners 7 which are herein of relatively narrow construction and rounded upwardly at opposite ends, as shown at 8 and 9 (see Fig. 4), are independently mounted with respect to the plow body for relative vertical movement, permitting said runners to be lowered or raised when the portions of the plow adjacent thereto are passing over irregularities in the roadway or surface traversed thereby, effecting support for the entire plow regardless of the contour of the ground. To provide for said vertical adjustment said runners 7 have broadened tread portions 10 and superposed relatively thin webs 11 which desirably decrease in length toward their upper ends. To the upper end of the tapered portion 11 of each runner is secured a bifurcated stem 12 which straddles the web 11 and is secured in such relation near its upper end by a horizontal pivot pin 13. The lower ends of the bifurcated stem 12 are laterally stiffened or supported by a rivet or pin 14 which extends through a segmental slot 15 (see Fig. 4) formed in the web 11 and arranged on an arc whose center is approximately the center of the pivot pin 13, thus allowing for a limited fore and aft swinging of the runner 7, whereby it may adjust itself to irregularities upon the surface travelled.

The webs 11 of the several runners are each housed in vertical guide members or housings 16 which are of sufficient size relative to the webs to permit of vertical adjustment of each runner relative to the plow and a limited fore and aft movement relatively thereto but preventing any lateral movement of said runners relative to said plow. The guide members 16 are enlarged at 17 to provide clearance for the bifurcated stem 12, permitting free vertical or substantially vertical movements of said stem with its runner.

The snow removing or deflecting members of the plow are gracefully curved upwardly and rearwardly from the lower forward working edges 19 for the greater portion of their height, again curving forwardly at their upper edges as shown at 21 to provide a deflecting surface which will more easily and perfectly deflect or roll the snow from the center of the roadway outwardly and upwardly over the tops of the banks of the snow along the sides of the path made thereby.

In view of the inclination of said snow removing members and the desirability of keeping the stems 12 as close to the rear sides thereof as possible, said stems are herein inclined at an angle best suited to the adjustment of said runners. The guide members 16 for said runners are desirably secured to the rear sides of the snow deflecting or removing members and wings 2, 3, 5 and 6, although it is to be understood that the invention is not limited to the particular arrangement of the runners shown.

The runners 7 are herein arranged parallel with each other fore and aft of the plow, and in order to maintain them in their positions the forward ends 23 of the guide members 16 are formed to fit and are secured by welding or otherwise to the rear sides of said members 2, 3, 5 and 6 respectively. Vertical movement of the runner member 7 may be effected in many ways but herein I have provided jack means including screw threads 25 formed upon the upper end of each stem 12 to engage a correspondingly threaded sleeve 27 to which rotary movement is imparted when adjustment of the runner is desired. To make the rotary movement of the sleeve 27 effective to raise and lower said runner said sleeve is herein provided with angular shoulders 29 and 30 arranged respectively to seat at 31 against the upper end of the guide bracket 16 and to seat at 32 against the under side of a yoke 33 secured to the upper end of said bracket 16. A thrust washer 34 is desirably interposed between the upper shoulder 30 and said yoke to receive the thrust of the weight of the plow on said runners. By restricting the movement of said sleeve 27 between said yoke and the bracket 16 it will be apparent that rotary movement of said sleeve will cause the screw-threaded stem 12 to be moved longitudinally thereof up or down relatively to the snow removing member.

Each sleeve 27 is desirably connected by a universal connection 35 with a substantially upright shaft 36 rotatably arranged in bearings 37 and 38 secured to the rear face of a snow removing member, the upper end of said shaft being herein squared, as shown at 39, to fit a wrench member 40 desirably of the ratchet type for effecting rapid manual rotation of the screw-threaded sleeve 27 and the consequent raising or lowering of its runner.

Desirably the supporting members 16 are provided adjacent their lower ends with lateral ribs 41 and to these ribs are secured webs 42, herein of sheet metal, which extend from one support to an adjacent one along the lower edge of said snow removing members, thus laterally bracing said runner supports and materially contributing toward the stiffening of the snow deflecting members.

The squared portions 39 of the sleeve operating shafts 36 are extended upwardly to positions where they may be conveniently operated either from the front or rear of the plow.

The snow removing members 2 and 3 are laterally braced or supported from within by a transverse partition 44 desirably of sheet metal and of considerable height, appropriately secured by welding or otherwise at either side to the rear faces of the members 2 and 3, and extending rearwardly from said partition 44 are vertical frames 45 and 46 which are spaced far enough apart to receive the power operating means for the plow. The frames 45 and 46 are herein reinforced along their upper and lower outer edges by angles 47 and 48 (see particularly Figs. 1, 6 and 7).

Braces 49 extend forwardly from the frames 45 and 46 and obliquely to the outer ends of the wings 5 and 6 for the purpose of bracing said wings against the pressure of the snow.

The plow embodying this invention is primarily designed for use with crawler tractors, and in Figs. 1, 2 and 3 one of these tractors is shown operatively positioned within stall-like frame structures at the rear of the plow formed by said partition 44 and frames 45 and 46, said tractor being herein connected to said plow in such a way as to pull rather than push the plow along.

To the above end a draw bar 50 is arranged transversely of the rear of the tractor shown at 51 and is linked or otherwise yieldably coupled at 52 to the draft rigging represented at 53 of the tractor. To facilitate the connecting of said plow with and the disconnecting of the same from the tractor 51, the draw bar 50 is secured to the rear ends of side beams 54 and 55 which extend forwardly and into pivotal connection at 56 with the rear extremities of the frames 45 and 46, this pivotal connection permitting the draw bar 50 to be dropped to the ground so that the crawler tractor may ride over the same into the aforesaid stall-like frame structures arranged to receive it. It is furthermore within the scope and purpose of the invention to swing said bar 50 upward or to move the pivot bolt 56 from the side frames 45 and 46 and entirely disconnect said draw bar frame from the snow plow frame and provide free access of the tractor or driving means to and from the plow frame.

After the tractor has been driven into position and the draw bar properly connected to the draft rigging of said tractor the apparatus will be ready for operation either forwardly or rearwardly.

For the purpose of increasing traction by depressing the forward ends of the traction frames 63 I have herein provided at opposite sides of the nose portion of the plow which embraces the snow removing members 2 and 3, brackets 57 one of which is secured to the rear side of each of said members 2 and 3 (see particularly Fig. 7). An eye-bolt 58 is slidably arranged within each of said brackets with spring cushioning means 59 mounted thereon between the under side of the bracket and a nut 60 secured on said bolt. Flexibly connecting means 61 extend from the eye-bolt 58 to the forward ends, herein of extensions 62 secured to the forward ends of the side tractor members 63 of which the tractor is composed.

By reason of the foregoing resilient connecting means it will be apparent that the weight of the plow will constantly exert yielding downward pressure upon said traction members tending to depress said members and thereby increase traction.

The tractor frames 63 of the tractor are in the present example pivoted at their rear ends to rear sprocket shafts 64 and carry the crawler tracks 65, the forward ends of said tractor members being oscillatable about said rear axis to conform to the irregularities of the road surface in a manner common to crawler tractors. The extensions 62 of the tractor frames extend through slots or openings 66 formed in the transverse partition or-frame 44 of the snow plow and being connected as hereinbefore stated flexibly to said eye-bolts and yieldably with said brackets the relative bodily movements of the connected members will not be directly transmitted to each other when encountering irregularities in the ground or roadbed.

The flexible connections between the forward ends of the traction members of the tractor and the plow and those between the draw bar 50 and the rear of said tractor may within the scope and purpose of the invention be so constructed as to accomplish the turning of the plow by means of the tractor, but in the present example I have provided on the outer side of each of the tractor members bumpers 67 and 68 arranged respectively near the front and rear portions of said tractor members and adapted to abut against friction plates 69 and 70 carried by the frame members 45 and 46, said friction plates being of sufficient size to allow for more or less relative vertical or fore and aft movements of the plow and tractor. A bumper 71, herein composed of wood, is arranged transversely of the plow along the lower edge of the partition 44 and directly beneath the forward oscillatory ends of the frames 63, and serves to limit the downward movement of said tractor frames relatively to the plow or the upward movements of said plow relatively to the tractor.

The snow removing members 2 and 3 as hereinbefore stated desirably form a V-shaped nose approximately the width of the tractor so that if desired a narrow plow may be employed by removing or swinging inwardly the wings 5 and 6, but in the present example in addition to said wings 5 and 6 I also provide auxiliary wings 72 arranged near the outer ends of the wings 5 and 6 preferably slightly at the rear instead of forming direct continuations of said wings but projecting far enough behind said wings to catch all of the snow which escapes from the wings or snow removing members therein-front. The auxiliary wings do not in the present example extend the full height of the other snow removing members although the invention is not to be limited in this respect, and these auxiliary wings conform substantially to the contour of the main wings. At least one runner 43 is provided for each of said auxiliary wings 72 for supporting the latter when in their snow deflecting positions.

It is within the scope and purpose of the invention to move the auxiliary wings bodily from the position shown is full lines in Fig. 1 inwardly to dotted line positions where they will be out of contact with the snow and hence fail to function. To this end said wings are mounted herein upon triangular supporting frames 73 and 74, the bases of these triangular frames being pivotally secured at 75 and 76 to the frames 45 and 46. Desirably the frames 73 and 74 are parallelly arranged so as to form a rigid supporting frame for said wings and the triangles formed by said frames are reversed as will be seen by reference to Fig. 6 whereby one of said frames, herein the frame 73, has its outer free end pivotally connected with the lower end 77 of a bracket 78 and the outer free end of the frame 74 is secured herein to the upper portion of said bracket 78, said bracket being in turn secured to the auxiliary wing.

For convenience the movements of said wings from their outer or snow deflecting positions to their folded inactive positions are preferably along oblique planes so that as said wings are withdrawn they are raised out of contact with the snow or the ground. To accomplish this result the axes of the pivots for said triangular frames, at least as viewed in Fig. 7, are not in the same vertical plane but the lowermost of said pivots is moved rearwardly, thus insuring the upward oblique swinging movement of said auxiliary wings.

To maintain said wings in their various positions telescoping struts 79 are provided, said struts having an outer tubular portion 80, herein pivoted at 81 to the outer end of the draw bar frame, and a telescoping member 82 pivoted at 83 to the bracket 78 is adapted to be held by a pin 84 in adjusted relation to the other part of said strut, namely the tubular portion 80, said tubular portion being perforated to receive the pin 84 at appropriate points in its length for the purpose of maintaining said wings in their adjusted position.

In plows of the character herein described it is desirable to provide means for pushing the snow thrown up by the plow wings to the sides of the pathway away from the edge of said path so that it will not roll back into the same, and these wing extensions are desirably arranged near and secured to the upper portions of the wings 5 and 6.

In the present example I have provided wings for said purpose, herein indicated at 85, one of said wings being attached to the upper outer corner of each wing 5 and 6. The wings 85 are reinforced by angles 86 and 87 extending longitudinally thereof and having their inner ends pivoted at 88 and 89 respectively to brackets 90 secured against the rear faces of the wings 5 and 6.

For securing the wing extensions in their outer or extended position I herein provide a sliding bolt 91 mounted in guides 92 and 93 secured to the rear of each of said wings 5 and 6 and adapted to be extended across the back of the wing extensions 85 and into other guide blocks 94. Pins 95 are provided in said bolts to limit the sliding movements of said bolts in either direction by engaging respectively the blocks 92 and 93.

From the foregoing description it will be apparent that the plow embodying the invention may be tilted forwardly, rearwardly or laterally independently of the tractor by adjusting the several runners independently of each other. Furthermore the lower edge 19 of the snow removing members may be adjusted to the exact position desired with respect to the surface of the roadway, leaving only a very small thin layer of snow on said roadway or a considerable thickness thereof, or the said runners may be independently adjusted to properly support the frame when travelling over roadways or upon ground of uneven contour. The effective width of the plow may be varied and the auxiliary wings may likewise be adjusted to assist in balancing the plow, particularly when the wings at one side only of the plow are being employed, such for example as in cases where it is desired to widen a path already plowed, in which case the wings of one side only will contact with the bank of snow.

Although I have disclosed in detail one full and complete embodiment of my invention it is to be understood that the invention is not limited thereto.

Claims:

1. A snow plow comprising a snow removing member, a runner member supporting said member, jack means for raising and lowering said snow removing member relatively to said runner member and runner housing and guiding means for housing and supporting said runner throughout the raising and lowering movements of said member.

2. A snow plow comprising a snow removing member, a plurality of runners for supporting said member having longitudinal web portions, means for guiding said web portions, and jack means for raising and lowering said removing member on said runners.

3. A snow plow comprising a snow removing member having a reinforcing web arranged along the lower margin thereof, runner housings secured to said web and a plurality of independently adjustable runners mounted in said housings.

4. A snow plow comprising a snow removing member, runners independently adjustable vertically on said snow removing member, means for embracing and guiding said runners, said runners each having a limited fore and aft pivotal movement in said embracing and guiding means relatively to said member.

5. A snow plow comprising in combination an inclined snow removing member, a frame structure extending rearwardly from said snow removing member, a relatively movable snow deflecting member arranged at the rear of said snow removing member and movable obliquely from snow deflecting to inoperative positions, parallelly arranged members for supporting said snow deflecting members upon said frame structure and for effecting bodily movement of said snow deflecting member from operative to inoperative positions and means for holding said snow deflecting members in a plurality of positions.

6. A snow plow comprising in combination an inclined snow removing member, a frame structure extending rearwardly from said snow removing member, a relatively movable snow deflecting member arranged at the rear of said snow removing member and movable obliquely from snow deflecting to inoperative positions, parallelly arranged members for supporting said snow deflecting members upon said frame structure and for effecting bodily movement of said snow deflecting member from operative to inoperative positions and a runner for supporting said snow deflecting member while in operative position.

7. A snow plow comprising in combination a snow removing member, a wing adjustably arranged adjacent to the rear end of said snow removing member, means for holding said wing in a plurality of positions relatively to said snow removing member, and an extension for the upper portions of said snow removing member to push the snow thrown out by said snow removing member, back from the edge of the path formed by the plow.

8. A snow plow comprising in combination a snow removing member, a wing adjustably arranged adjacent to the rear end of said snow removing member, means for holding said wing in a plurality of positions relatively to said snow removing member, and a pivoted extension for the upper portions of said snow removing member to push the snow thrown out by said snow removing member, back from the edge of the path formed by the plow.

9. A snow plow comprising in combination a snow removing member, a wing adjustably arranged adjacent to the rear end of said snow removing member, means for holding said wing in a plurality of positions relatively to said snow removing member, a wing extension pivotally supported upon the upper rear end of said snow removing member to push back the snow removed by said snow removing member from the edge of the path, said wing extension including means removably to hold it in operative position.

In testimony whereof, I have signed my name to this specification.

FREDERICK ORREN SNOW, Jr.